Aug. 29, 1967
C. T. SCIANCE ETAL
3,338,959
PROCESS FOR SEPARATION AND RECOVERY OF
GLUTARIC, SUCCINIC AND ADIPIC ACIDS
Filed Aug. 22, 1962
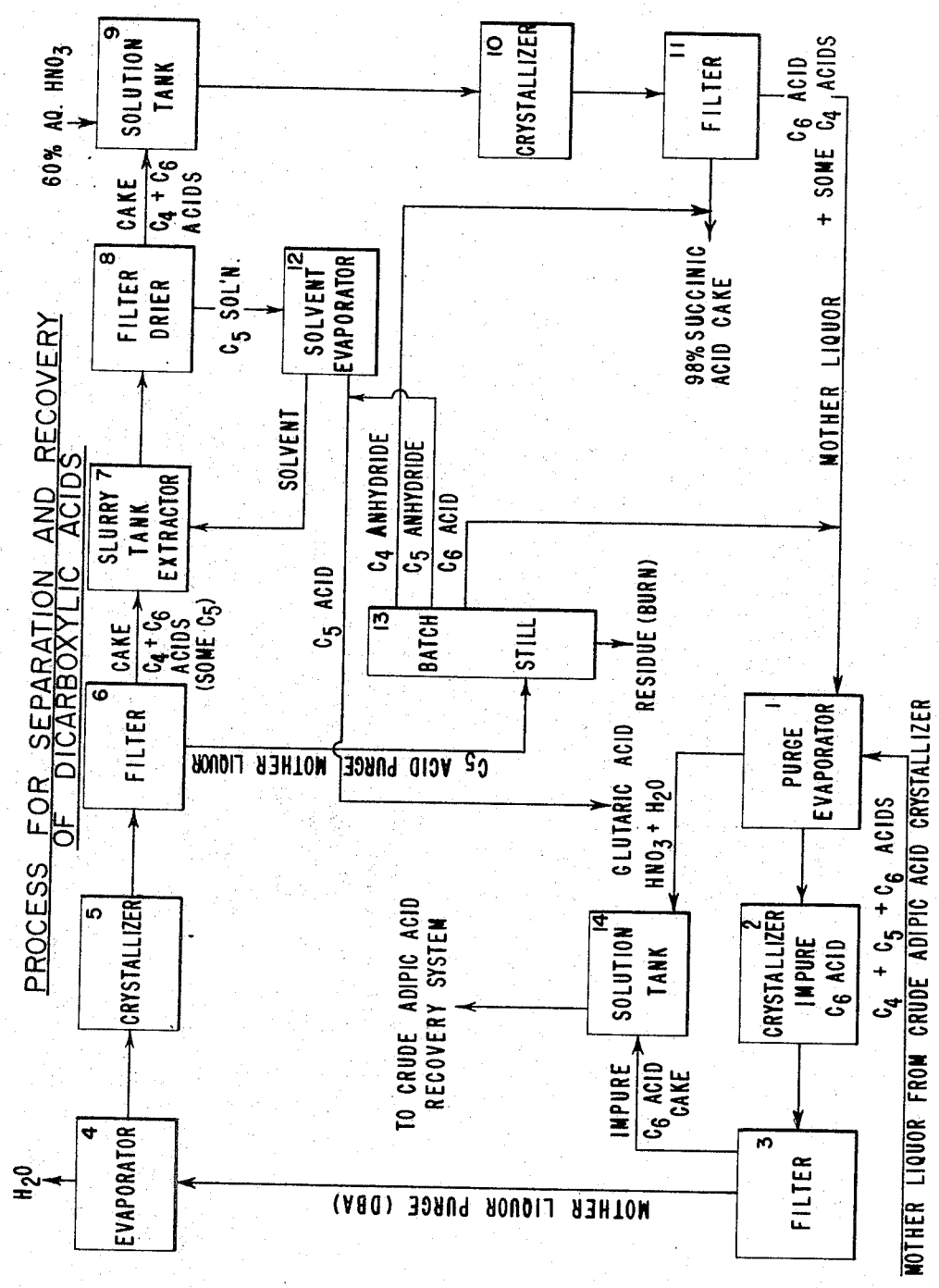
INVENTORS
C. THOMAS SCIANCE
LEON S. SCOTT
BY Roger A. Hiner
ATTORNEY United States Patent Office 3,338,959
Patented Aug. 29, 1967

3,338,959
PROCESS FOR SEPARATION AND RECOVERY OF GLUTARIC, SUCCINIC, AND ADIPIC ACIDS
Carroll Thomas Sciance, Lawton, Okla., and Leon Singrey Scott, Orange, Tex., assignors to E. I. du Pont de Nemours and Company, Wilmington, Del., a corporation of Delaware
Filed Aug. 22, 1962, Ser. No. 218,669
3 Claims. (Cl. 260—537)

This invention relates to a process for the separation and recovery of adipic acid, glutaric acid, and succinic acid from a by-product waste stream containing these acids. More particularly, this invention relates to a process whereby dibasic (dicarboxylic) acid waste stream (DBA), obtained after crystallization of crude adipic acid from the concentrated aqueous nitric acid stream obtained by nitric acid oxidation of mixtures of cyclohexanone and cyclohexanol, can be separated in an economic and practical fashion into the individual dicarboxylic acids in a state of high purity.

Adipic acid is prepared commerically on a very large scale as an intermediate for use in the preparation of nylons and as a food acid. One process which has been employed for this purpose involves air oxidation of cyclohexane and separation from the oxidate of cyclohexanol and cyclohexanone which are then further oxidized by concentrated nitric acid according to processes known to the art. It is well known that, in this nitric acid oxidation process, considerable percentages of the cyclohexanol and cyclohexanone are degraded into the glutaric and succinic acids containing one or two less carbon atoms than the starting material. When the nitric acid oxidation product is concentrated and crystallized, the principal product obtained as the crystal cake is crude adipic acid, which can then be refined further by means known to the art. The mother liquor purge from this crystallization, which contains a mixture of glutaric, succinic, and adipic acids, can be further concentrated and crystallized to give impure adipic acid for recycle to the crude adipic acid crystallizer. The mother liquor purge from this second crystallization step comprises a mixture of adipic, glutaric, and succinic acids which cannot be readily separated into the pure components. In this DBA mixture, the proportion of glutaric acid is greater than the proportion of succinic acid which, in turn, is greater than the proportion of adipic acid. Usually, glutaric acid comprises at least 50% of the weight of the dicarboxylic acids in the mixture. Simple concentration of this DBA solution followed by crystallization gives a mixed product containing more than 50%, by weight, succinic acid and from 20% to 45%, by weight adipic acid, but also some glutaric acid (1 part, by weight, per 35 to 50 parts of adipic plus succinic acids), and the mother liquor from this crystallization contains the bulk of the glutaric acid together with up to 12% each of succinic and adipic acids, based on the total weight of dicarboxylic acids.

Further separation of these products by simple crystallization from water has not proved technically feasible, due to the fact that adipic and succinic acids when present in these proportions, precipitate from aqueous solution together and carry an appreciable proportion of glutaric acid with them. Therefore, it has been customary to destroy this DBA mother liquor from the second crystallization step, after recovery of impure adipic acid from the crude adipic acid mother liquor purge, by concentration and burning, thus losing not only millions of annual pounds of adipic acid but even larger quantities of succinic and glutaric acids for which markets are now available, particularly for the preparation of esters useful as plasticizers and in alkyd-type resins.

Therefore, it is an object of this invention to provide a process whereby the mixture of dibasic acids in the mother liquor from the crystallization of impure adipic acid from the concentrated mother liquor purged from the crystallization of crude adipic acid obtained by nitric acid oxidation of cyclohexanol and cyclohexanone, can be economically separated and recovered as acids of high purity. Other objects and advantages of this invention will appear hereinafter.

The process discovered in accordance with the objects of this invention depends in part for its success upon the surprising discovery that 98% or better succinic acid can be obtained by recrystallization, from aqueous $HNO_3$, having an $HNO_3$ concentration of 50% to 70% by weight, preferably 55% to 65%, by weight, of a mixture of succinic and adipic acids in which succinic acid predominates but in which as much as 20% to 45% adipic acid is also present.

The process of this invention is best understood by reference to the flow sheet shown in FIGURE 1, which is a diagrammatic representation of the process. The feed for this process comes into the purge evaporator 1 from the crude adipic acid crystallizer in which a major portion of the adipic acid prepared by nitric acid oxidation of a mixture of cyclohexanol and cyclohexanone has been recovered as a precipitate. The mother liquor from this filter which comes into the purge evaporator is an aqueous nitric acid solution of a mixture of adipic, glutaric, and succinic acids which for brevity, may be referred to as $C_6$, $C_5$, and $C_4$ acids, respectively.

In the purge evaporator, the major portion of the remaining $HNO_3$, together with part of the water, is removed overhead and sent to solution tank 14. After this concentration step, the concentrated hot solution is mixed with $H_2O$ and passed to crystallizer 2 where it is cooled and an impure adipic acid precipitates. This slurry is then passed to filter 3 and the impure adipic acid separated as a cake which is sent to solution tank 14 and dissolved in the dilute nitric acid and then passed back to the crude adipic acid recovery system which follows the nitric acid recovery system which follows the nitric acid oxidizer in the synthesis system. This much is old, and has been practiced for a number of years by the industry.

The purged filtrate from filter 3, which is referred to herein as DBA, is a mixture of $C_4$, $C_5$, and $C_6$ acids which it has not been practical to separate in the past by any economic method. Usually at least 50% of the dicarboxylic acid component in this DBA stream is glutaric acid, and this percentage of glutaric acid may rise as high as 70–80% by weight, based on the total weight of the dicarboxylic acids in this mixture. In addition to the three acids, high molecular weight addition products and various degradation products and color formers are present in this material.

According to the process of this invention, this purged DBA stream, instead of being sent to concentration and burning, as in the past, is passed to evaporator 4 where a major portion of the water is taken overhead, and then to crystallizer 5 where it is cooled and a mixture of adipic and succinic acids precipitates, carrying down with it a small portion of the glutaric acid. From crystallizer 5, this precipitate is passed to filter 6.

From filter 6, the solid cake of mixed acids may be passed to a slurry tank 7 where it is contacted and slurried with diisopropyl ether solvent. It has been discovered that diisopropyl ether has the unique property of extracting glutaric acid from a slurry of these mixed acids in the absence of any substantial proportion of water, without dissolving succinic and adipic acids. This discovery may be used in this matter to remove excess quantities of glutaric acid from the crystalline product without loss of appreciable quantities of adipic and succinic acids. The slurry is passed from the tank 7 to filter drier 8 where the solution of C$_5$ acid in diisopropyl ether is taken off as a mother liquor. The cake from filter drier 8 is passed to a solution tank 9 and dissolved by warming with 4–20 parts by weight of 60% aqueous nitric per part of adipic acid. From solution tank 9, this solution is passed to crystallizer 10 where it is cooled and allowed to crystallize. From crystallizer 10, the slurry precipitate is passed to filter 11 and the cake separated from the mother liquor. Surprisingly, it has been discovered that while there is actually a substantial proportion of adipic acid present in the solution, the precipitate obtained from 60% aqueous nitric acid under these conditions, is 98% or better pure succinic acid.

The mother liquor from filter 11, which contains the adipic acid, is passed back to purge evaporator 1 and hence eventually to solution tank 14 via crystallizer 2 and filter 3 and hence returned to the crude adipic acid recovery system.

The solution of glutaric acid and diisopropyl ether obtained as the mother liquor from filter drier 8 is passed to an evaporator 12; the solvent is taken overhead and recycled to slurry tank 7. The cake of C$_5$ acid is then available for further purification if desired when combined with a stream obtained from batch still 13.

Batch still 13 is charged periodically with the purged mother liquor from filter 6 which comprises principally aqueous glutaric acid. However, there are also present in this stream appreciable proportions of both succinic and adipic acids. Succinic anhydride is first distilled over, then the glutaric acid (also as the anhydride). The impure C$_6$ acid is removed overhead last and the high-boiling residue is then burned. This residue takes with it most of the color formers and other undesirable impurities in the DBA purge. The glutaric anhydride obtained from the batch still 13 is added to the glutaric acid obtained from solvent evaporator 12. This glutaric acid can be further purified by such methods as melt crystallization or esterification with an alcohol, such as methanol or ethanol, followed by rectification of the ester.

As an alternative method of recovering the glutaric acid from the purged mother liquor or filter 6, this mother liquor can be dehydrated by evaporation and then esterified with, for instance, methanol, and then the batch still 13 operated to separate the esters.

The extraction of glutaric acid in the slurry tank extractor 7 from the mixture of succinic and adipic acids obtained from filter 6 serves to prevent a build-up of glutaric acid by preventing any recycle of glutaric acid to purge evaporator 1 with the mother liquor from filter 11. However, it is possible to operate this system to achieve recovery of each of the dibasic acids with the elimination of the extraction step, i.e., the elimination of slurry tank 7, filter drier 8, and solvent evaporator 12. This, however, results in a build-up of glutaric acid in the system.

The following examples are supplied to illustrate the invention disclosed, but the invention is not limited to the employment of the particular dibasic acid streams exemplified. In the first example, a dibasic acid stream in which the glutaric acid is approximately equivalent to the sum of the succinic plus the adipic acids, is employed, and in a second example, a DBA stream is employed in which the glutaric acid is approximately equal to three times the sum of the succinic plus the adipic acids in the dibasic acid mixture. As can be seen from the following examples, a mixture of dicarboxylic acids particularly suitable as the starting material for carrying out the separation process of this invention is one consisting essentially of about 12% to 24% adipic acid, about 50% to 74% glutaric acid, and about 13% to 25% succinic acid, the percentages being by weight, based on anhydrous acids.

EXAMPLE 1

In this example, the compositions of the streams, indicated in pounds per hour, are shown in Table I. The numbers following identification of various pieces of equipment relate to the numbers shown in FIGURE 1.

Table I

EXAMPLE 1.—RECOVERY OF C$_4$, C$_5$, AND C$_6$ ACIDS FROM DBA IN WHICH C$_5$≅C$_4$+C$_6$

[Pounds per hour]

| | DBA as sent to the purge evap. 1 | C$_4$+C$_5$+C$_6$ acids from evap. 4 sent to crystallizer 5 | Purged C$_5$ acid soln. from filter 6 sent to batch still 13 | C$_4$+C$_6$ acids in cake from filter 8 sent to soln. tank 9 | C$_4$ acid cake from filter 11 | C$_6$ acid purge from filter 11 sent to purge evap. 1 |
|---|---|---|---|---|---|---|
| Glutaric Acid (C$_5$ Acid) | 1,130 | 1,130 | 1,107 | | | |
| Succinic Acid (C$_4$ Acid) | 565 | 801 | 136 | 665 | 429 | 236 |
| Adipic Acid (C$_6$ Acid) | 528 | 418 | 110 | 305 | 11 | 294 |

In addition to the 429 lbs./hour of succinic acid recovered in the cake from filter 11 as shown in Table I, approximately 80%%% of the 136 lbs./hour of the succinic acid sent to batch still 13 as shown in Table I can be recovered, as well as approximately 80% of the 110 lbs./hour of adipic acid sent to batch still 13. About 23 lbs./hour of glutaric acid can be recovered from the solvent extraction step after evaporation of the solvent evaporator 12.

EXAMPLE 2

This example is carried out in the same fashion as Example 1, but employs a dibasic acid solution entering purge evaporator 1 which contains a much higher proportion of glutaric acid. The compositions of the various streams achieved, according to the process of this invention, are shown in Table II.

Table II

EXAMPLE 2.—RECOVERY OF C$_4$, C$_5$, AND C$_6$ ACIDS FROM DBA IN WHICH C$_5$≅3 (C$_4$+C$_6$)

[Pounds per hour]

| | DBA as sent to the purge evap. 1 | C$_4$+C$_5$+C$_6$ acids from evap. 4 sent to crystallizer 5 | Purged C$_5$ acid soln. from filter 8 sent to batch still 13 | C$_4$+C$_6$ acids in cake from filter 8 sent to soln. tank 9 | C$_4$ acid cake from filter 11 | C$_6$ acid purge from filter 11 sent to purge evap. 1 |
|---|---|---|---|---|---|---|
| Glutaric Acid (C$_5$ Acid) | 8,160 | 8,160 | 8,117 | | | |
| Succinic Acid (C$_4$ Acid) | 1,447 | 1,641 | 1,000 | 641 | 447 | 194 |
| Adipic Acid (C$_6$ Acid) | 1,382 | 1,058 | 810 | 248 | 10 | 238 |

Again, additional succinic and adipic acids can be recovered from batch still 13, as indicated in Example 1. In addition, about 43 lbs./hour of glutaric acid can be recovered from the extraction with diisopropyl ether.

In both of the foregoing examples, the batch still can be operated under the following conditions:

| Product Cut | Temp., °C. | | Head Pres., mm. Hg Abs. | Reflux Ratio |
|---|---|---|---|---|
| | Head | Base | | |
| Low Boilers | 100 | 180 | 18 | 1/1–3/1 |
| Succinic Anhydride | 140–150 | 205–215 | 18 | 1/1–6/1 |
| Glutaric Anhydride | 150–160 | 215–230 | 18 | 1/1–3/1 |
| Adipic Acid | 220 | 230 | 18 | 0.2 |

The adipic acid is recovered from this process by recycling the solution from tank 14 to the concentrating still which follows the nitric acid oxidation reactor in the synthesis process for the preparation of adipic acid by the oxidation of a mixture of cyclohexanol and cyclohexanone. From this concentrating still, the crude mixture passes to a crysallizer and then to a filter where a cake of crude adipic acid is taken off and the filtrate is purged to purge evaporator 1. The crude adipic acid is subsequently purified by further recrystallization.

Glutaric acid is soluble to the extent of about 6% in the diisopropyl ether solvent employed for its extraction from the mixture of adipic plus succinic acids. This extraction can be carried out at a temperature in the range of 18° to about 35° C. This cake, which is extracted with diisopropyl ether, contains from about 35–50 parts of the mixture of succinic plus adipic acids per part of glutaric acid. Sufficient diisopropyl ether must be employed here to completely dissolve the glutaric acid for most effective operation of the process. As noted before, the solubility of glutaric acid in diisopropyl ether is about 6%, and hence the proportion of diisopropyl ether employed can be calculated depending upon the weight of glutaric acid in this cake. More than enough solvent to prepare a saturated solution is required for most effective operation of the system. A suitable proportion is one which will give about 4% of glutaric acid in the diisopropyl ether, or in other words, only 66% of saturation. Putting this another way, at least 94 parts by weight of diisopropyl ether, based on the glutaric acid present in the mixture of adipic and succinic acids, must be employed, and preferably, 124 up to 200 parts by weight, based on the glutaric acid present in said mixture, should be employed.

Crystallizer 5, in which the mixture of $C_4$ plus $C_5$ plus $C_6$ acids is separated from a mother liquor rich in glutaric acid, preferably is operated at a temperature in the range of 30–35° C. This temperature range is also suitable for operation of crystallizer 2. Crystallizer 10 should be operated in the range of 60–70° C. Solution tanks 9 and 14 are preferably operated at a temperature above 90° C. in the range of 92–110° C.

We claim:

1. A process for the separation of individual dicarboxylic acids from a mixture consisting essentially of about 12% to 24% adipic acid, about 50% to 74% glutaric acid, and about 13% to 25% succinic acid by weight, based on anhydrous acids, in which the proportion of glutaric acid is greater than the proportion of succinic acid and the proportion of succinic acid is greater than the proportion of adipic acid by:
   (a) dissolving the mixed acids in hot water, cooling, collecting a precipitate, consisting essentially of a mixture of more than 50%, by weight, succinic acid, and from about 20% to about 45%, by weight, adipic acid and a filtrate containing the bulk of the glutaric acid; and
   (b) dissolving the precipitated mixture of succinic acid and adipic acid in hot aqueous nitric acid having a concentration of $HNO_3$ in the range of 50% to 70%, by weight, cooling, and collecting the precipitated succinic acid; and
   (c) recovering adipic acid from the mother liquor from (b) by evaporation of the $HNO_3$ and concentration of the aqueous solution, cooling, and collecting the adipic acid precipitated from the concentrated aqueous solution.

2. A process for the separation of individual dicarboxylic acids from a mixture consisting essentially of about 12% to 24% adipic acid, about 50% to 74% glutaric acid, and about 13% to 25% succinic acid, by weight, based on anhydrous acids, in which the proportion of glutaric acid is greater than the proportion of succinic acid, and the proportion of succinic acid is greater than the proportion of adipic acid by:
   (a) dissolving the mixed acids in hot water, cooling, collecting a precipitate, consisting essentially of a mixture of more than 50%, by weight, succinic acid and from 20% to 45%, by weight, adipic acid, and a filtrate containing the bulk of the glutaric acid; and
   (b) extracting the precipitated mixture consisting essentially of succinic acid and adipic acid with diisopropyl ether to remove the glutaric acid carried down with this precipitate; and
   (c) dissolving the precipitated mixture of succinic acid and adipic acid, after extraction with diisopropyl ether, in hot aqueous nitric acid having a concentration of $HNO_3$ in the range of 50% to 70%, by weight, cooling, and collecting the precipitated succinic acid; and
   (d) recovering the adipic acid from the mother liquor from (c) by evaporation of the $HNO_3$ and concentration of the aqueous solution, cooling, and collecting the adipic acid precipitated from the concentrated aqueous solution.

3. A process for recovering succinic acid from a mixture of dicarboxylic acids consisting essentially of more than 50%, by weight, succinic acid and from about 20% to about 45%, by weight, adipic acid, by dissolving the mixture in hot aqueous nitric acid having a concentration of $HNO_3$ in the range of 55% to 65%, by weight, cooling, and collecting the precipitated succinic acid.

References Cited

UNITED STATES PATENTS

| 2,824,135 | 2/1958 | Corcoran | 260—537 |
| 2,840,607 | 6/1958 | Attane | 260—537 |
| 2,878,276 | 3/1959 | Crowley | 260—537 X |

OTHER REFERENCES

"Handbook of Chemistry and Physics," 32 edition, Chemical Rubber Publishing Co. (1951), pp. 684–685, 910–911 and 1126–1127.

LORRAINE A. WEINBERGER, *Primary Examiner.*

LEON ZITVER, RICHARD K. JACKSON, *Examiners.*

D. P. CLARKE, *Assistant Examiner.*